United States Patent
Kawaguchi et al.

(10) Patent No.: US 8,717,144 B2
(45) Date of Patent: May 6, 2014

(54) RFID SYSTEM WITH DISTRIBUTED READERS

(75) Inventors: Dean Kawaguchi, San Jose, CA (US); Edward M. Farrell, Saratoga, CA (US)

(73) Assignee: Intelleflex Corporation, Santa Clara, CA (US)

( * ) Notice: Subject to any disclaimer, the term of this patent is extended or adjusted under 35 U.S.C. 154(b) by 923 days.

(21) Appl. No.: 12/111,808

(22) Filed: Apr. 29, 2008

(65) Prior Publication Data
US 2009/0267737 A1 Oct. 29, 2009

(51) Int. Cl.
*H04Q 5/22* (2006.01)

(52) U.S. Cl.
USPC ............... 340/10.1; 340/572.1; 340/572.7; 340/572.8

(58) Field of Classification Search
USPC ........................................................ 340/10.1
See application file for complete search history.

(56) References Cited

U.S. PATENT DOCUMENTS

| | | | | |
|---|---|---|---|---|
| 5,686,902 A * | 11/1997 | Reis et al. | ...... | 340/10.2 |
| 6,034,603 A * | 3/2000 | Steeves | ...... | 340/10.2 |
| 6,084,530 A * | 7/2000 | Pidwerbetsky et al. | ...... | 340/10.1 |
| 6,097,301 A * | 8/2000 | Tuttle | ...... | 340/693.9 |
| 6,608,551 B1 * | 8/2003 | Anderson et al. | ...... | 340/10.51 |
| 6,725,014 B1 * | 4/2004 | Voegele | ...... | 455/41.2 |
| 7,084,739 B2 * | 8/2006 | Taki et al. | ...... | 340/10.1 |
| 7,253,717 B2 * | 8/2007 | Armstrong et al. | ...... | 340/10.2 |
| 8,107,446 B2 * | 1/2012 | Shoarinejad | ...... | 370/338 |
| 2005/0088284 A1 | 4/2005 | Zai et al. | ...... | 340/10.2 |
| 2005/0231367 A1 * | 10/2005 | Bellantoni | ...... | 340/572.1 |
| 2006/0012465 A1 * | 1/2006 | Lee et al. | ...... | 340/10.2 |
| 2006/0022800 A1 | 2/2006 | Krishna et al. | ...... | 340/10.2 |
| 2006/0022801 A1 | 2/2006 | Husak et al. | ...... | 340/10.5 |
| 2006/0022823 A1 | 2/2006 | Ryal | ...... | 34/572.1 |
| 2006/0044147 A1 * | 3/2006 | Knox et al. | ...... | 340/686.1 |
| 2006/0082458 A1 | 4/2006 | Shanks et al. | ...... | 340/572.4 |
| 2006/0170565 A1 | 8/2006 | Husak et al. | ...... | 340/825.49 |
| 2007/0046467 A1 * | 3/2007 | Chakraborty et al. | ...... | 340/572.1 |
| 2007/0103303 A1 | 5/2007 | Shoarinejad | ...... | 340/572.1 |
| 2007/0126554 A1 | 6/2007 | Choi et al. | ...... | 340/10.1 |
| 2007/0126585 A1 | 6/2007 | Okunev et al. | ...... | 340/572.7 |
| 2007/0182567 A1 * | 8/2007 | Stewart et al. | ...... | 340/572.8 |
| 2008/0079541 A1 * | 4/2008 | Rofougaran | ...... | 340/10.1 |
| 2008/0165058 A1 * | 7/2008 | Ayachitula et al. | ...... | 342/359 |
| 2008/0180220 A1 * | 7/2008 | Hollister et al. | ...... | 340/10.2 |
| 2008/0278288 A1 * | 11/2008 | O'Brien | ...... | 340/10.1 |
| 2009/0160611 A1 * | 6/2009 | Calvarese et al. | ...... | 340/10.1 |
| 2009/0224918 A1 * | 9/2009 | Copeland | ...... | 340/572.1 |

* cited by examiner

*Primary Examiner* — Kerri McNally
(74) *Attorney, Agent, or Firm* — Zilka-Kotab, PC

(57) ABSTRACT

A system in one embodiment includes a plurality of Radio Frequency Identification (RFID) readers, each reader being capable of using a single antenna for both transmit and receive functions, wherein, during operation, one of the readers transmits and at least another of the readers receives a response to the transmission from an RFID device. A system in another embodiment includes a plurality of Radio Frequency Identification (RFID) readers, each reader having at least one antenna mounted on a housing thereof, wherein, during operation, the reader transmitting emits a signal sufficient to communicate with a battery assisted passive RFID device at a range of at least 20 meters. Additional systems and methods are also presented.

31 Claims, 6 Drawing Sheets

RFID SYSTEM WITH DISTRIBUTED READERS

FIELD OF THE INVENTION

The present invention relates to Radio Frequency Identification (RFID) systems and methods, and more particularly, this invention relates to RFID systems with distributed readers and related methods.

BACKGROUND OF THE INVENTION

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, wireless communication can occur between an RFID tag and an RFID tag reader. This type of communication is advantageous, as it precludes the need for a direct contact or line of sight connection between the tag and the reader.

Existing passive RFID readers use transmit and receive in a single reader, primarily because the range of passive RFID is not very far, e.g. 10-20 ft. Existing battery assisted passive (BAP) RFID readers are built similarly, but need good isolation between the transmit antenna and the receive antenna to minimize leakage of the transmitting antenna back into the receiver. For example, some readers require about 40 dB of isolation between transmit and receive antennas, to get good range. This amount of isolation typically requires that the transmit and receive antennas of the reader be placed far away from each other, or requires use of directional gain pointing in the same direction which reduces the coupling between antennas by being far enough down the beamwidth of the antenna. This directional nature of the antennas also means that each pair of antenna can only cover a section of the area adjacent to the reader, e.g. a 90 degree arc pointing away from its position. To cover an entire 360 degree angle, multiple pairs of antennas are required per reader, e.g. 4 pairs of 90 degree antennas. This adds cost by requiring multiple RF ports on the reader, multiple antennas, multiple coax cables, multiple mounting brackets, and long installation times.

SUMMARY OF THE INVENTION

A system in one embodiment includes a plurality of Radio Frequency Identification (RFID) readers, each reader being capable of using a single antenna for both transmit and receive functions, wherein, during operation, one of the readers transmits and at least another of the readers receives a response to the transmission from an RFID device.

A system in another embodiment includes a plurality of Radio Frequency Identification (RFID) readers, each reader having at least one antenna mounted on a housing thereof, wherein, during operation, the reader transmitting emits a signal sufficient to communicate with a battery assisted passive RFID device at a range of at least 20 meters.

A method in one embodiment includes instructing one Radio Frequency Identification (RFID) reader to transmit; receiving information from a plurality of RFID readers corresponding to a signal from an RFID device received by the plurality of readers, each of the readers independently processing the signal from the RFID device, the information including a characteristic of the signal from the RFID device; selecting at least one of the readers from which the information is received based on the information; and processing additional information received from the selected at least one of the readers and corresponding to the signal from the RFID device.

A method in yet another embodiment includes instructing one Radio Frequency Identification (RFID) reader to transmit; receiving information from a plurality of RFID readers, the information corresponding to a signal from an RFID device received by the plurality of readers, each of the readers independently processing the signal from the RFID device, the information including a characteristic of the signal from the RFID device; selecting a new reader to transmit based on the information; and instructing the new reader to transmit to the RFID device.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
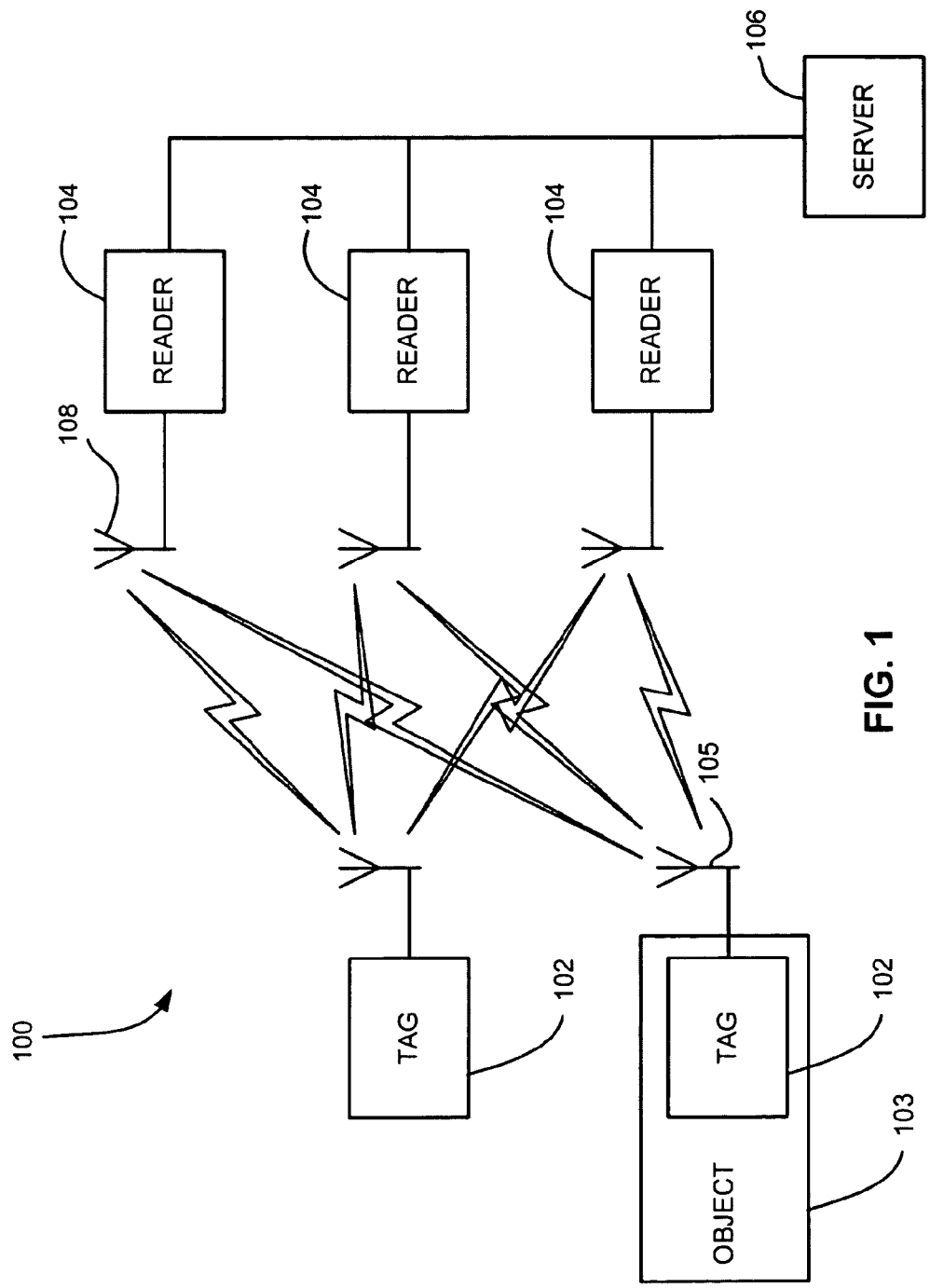
FIG. 1 is a system diagram of an RFID system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

In the drawings, like and equivalent elements are numbered the same throughout the various figures.

FIG. 1 depicts a general RFID system 100 according to one embodiment, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

One or more of the RFID devices 102 may be coupled to an object 103, such as an article of manufacture, an electronic device, a container, a device, a person, etc.

With continued reference to FIG. 1, one or more remote devices 104 such as interrogators or "readers" communicate with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader(s) 104.

The system 100 may also include an optional backend system 106 such as a coordinator or server. Such backend system may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

---

Class-1
    Identity tags (RF user programmable, range ~3 m)
    Lowest cost
Class-2
    Memory tags (20 bit address space programmable at ~3 m range)
    Security & privacy protection
    Low cost
Class-3
    Semi-passive tags (also called semi-active tags and battery assisted passive (BAP) tags)
    Battery tags (256 bits to 2M words)
    Self-Powered Backscatter (internal clock, sensor interface support)
    ~100 meter range
    Moderate cost
Class-4
    Active tags
    Active transmission (permits tag-speaks-first operating modes)
    ~30,000 meter range
    Higher cost

---

In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
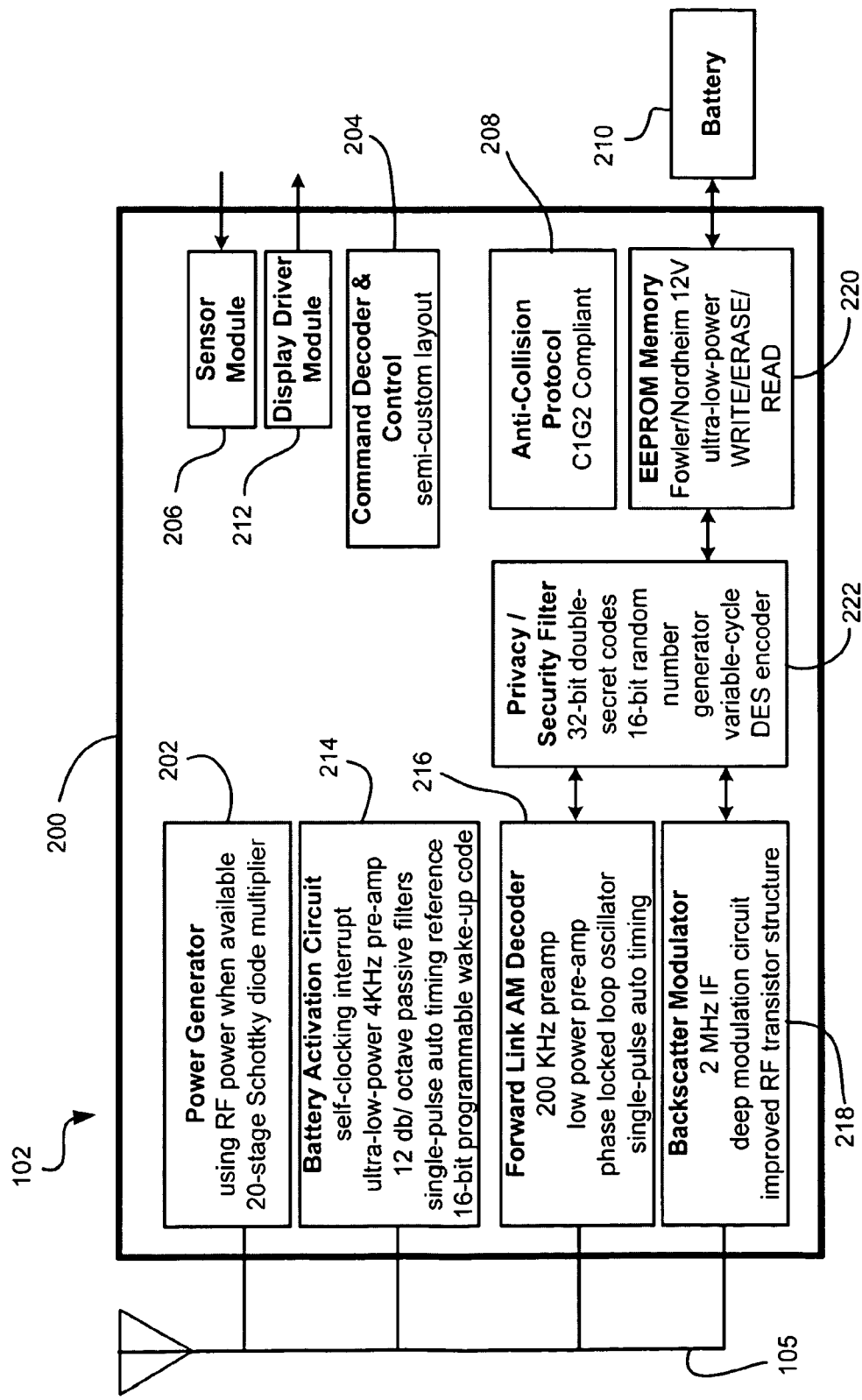
FIG. 2 is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID device 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one approach, the memory cell preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. This permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of an electronic device to which coupled (e.g., its battery, AC adapter, etc.); or both. Further, the RFID device may include a supplemental power source, e.g., one that captures energy from outside the tag, be it from solar, RF, kinetic, etc. energy. Note that while the present description refers to a "supplemental" power source, the supplemental power source may indeed be the sole device that captures energy for operation of the tag, e.g., as some passive RFFD tags extract energy from the reader signal as their sole means of power.

In one general embodiment, shown generally with reference to FIG. 1, a system according to one embodiment includes a plurality of RFID readers 104, each reader 104 being capable of using a single antenna 108 for both transmit and receive functions. While three readers 104 are shown in FIG. 1, it should be appreciated that only two readers 104 need be present. Further, more than three readers 104 may be present in various embodiments. During operation, one of the readers 104 transmits and at least another of the readers 104 receives a response to the transmission from an RFID device 102 such as an RFID tag. Such a response may be a backscattered signal. Conventional transmit and receive protocols and hardware may be used in any of the various embodiments.

While readers 104 with multiple antennas 108 coupled thereto may be used in some embodiments, readers 104 in other embodiments only have a single antenna 108 coupled thereto. In further embodiments, some readers 104 may have multiple antennas 108, while other readers 104 in the system have only a single antenna 108 coupled thereto.

A reader 104 having only a single antenna 108 coupled to it may have only a single antenna port, or multiple antenna ports. In one approach, the antenna 108 is located remotely from a housing of the reader 104, and can be coupled thereto using any traditional mechanism, such as coaxial cable, etc.

In one particularly preferred approach, the antenna 108 is mounted on a housing of the reader 104. For instance, the antenna 108 may be detachably or fixedly coupled to the housing. For instance, the antenna can be coupled by threaded fastener directly to the RF port of the housing. In another approach, the antenna 108 can be integrated into, e.g., partially or fully embedded in, the housing material. The housing (or portion thereof) closest to the antenna 108 may constructed of an RF transparent material such as plastic. This is particularly useful where the antenna is embedded in or behind the housing. In other embodiments, the housing may be RF reflective or absorptive, thereby acting as an RF shield.

The antenna 108 is preferably omnidirectional (i.e., provides about 360° coverage), but may be directional in some embodiments.

In a particularly preferred approach, each reader 104 is capable of transmitting and receiving RF signals with a single antenna 108 with very little isolation, even when emitting a signal sufficient to communicate with a BAP RFID tag at a range of at least 20 meters. Use of a single antenna 108 is enabled by using one or more readers 104 to receive the backscatter from a tag which is responding to a different reader 104's transmission. The transmitting reader 104 is preferably separated by enough distance from the receiving reader 104 that the transmit-to-receive isolation is enough for long range communication. In one example, the transmitting reader 104 is separated from the nearest receiving receiver by a distance sufficient to provide a transmit-to-receive isolation of greater than about 40 dB at normal transmitting power.

Embodiments having only one antenna 108 reduce costs dramatically by requiring only one omni-directional or directional antenna 108, which can be built into the reader 104 housing and eliminating coaxial cables. Reader 104 cost may be further reduced by having only one RF port. Installation time is dramatically reduced by having to mount only the reader 104 and integrated antenna 108 as one unit.

In one particularly preferred approach, a common control point, which may be a server 106, one of the readers 104, etc., controls which reader(s) transmit and/or selects which information to use from which receiving readers.

Figure 3:
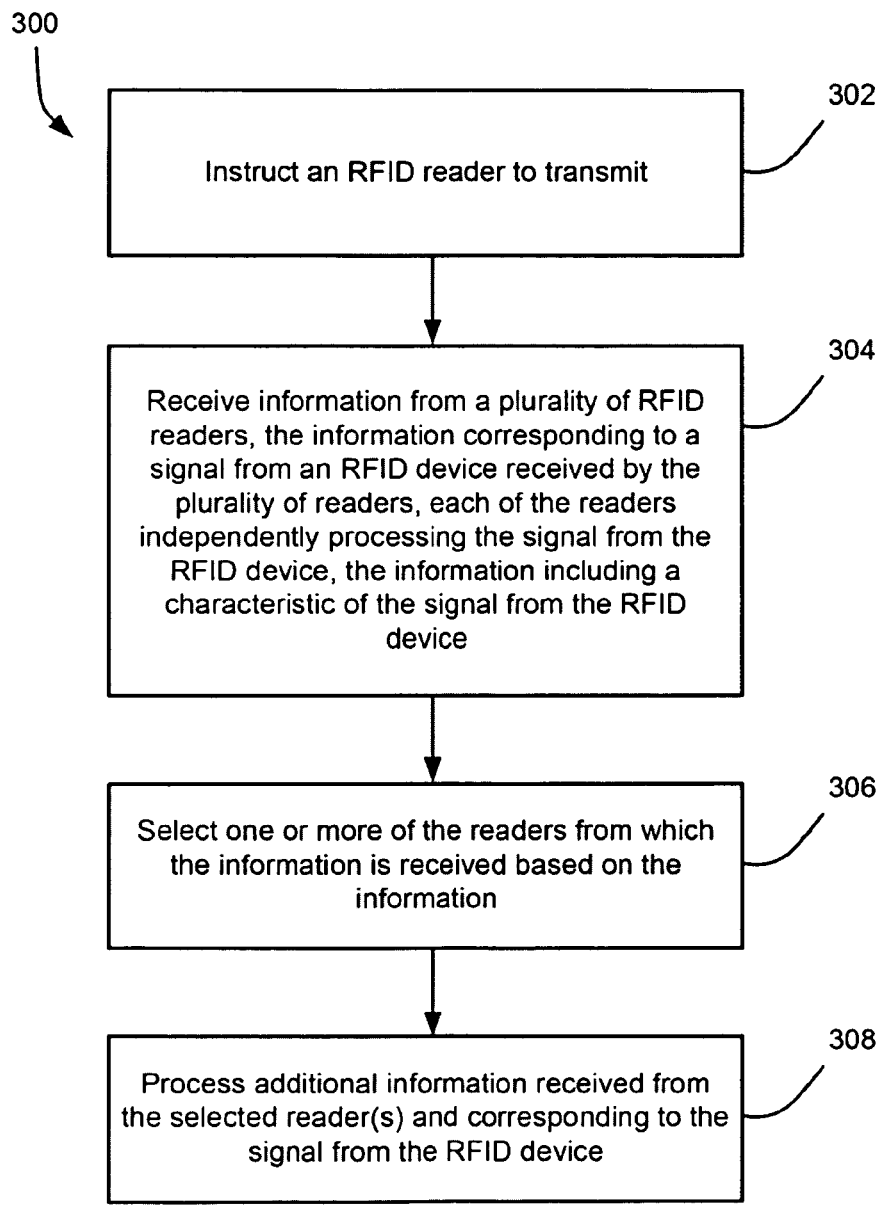
FIG. 3 is a process diagram of a process performed by a control point in one embodiment.

FIG. 3 depicts a process 300 performed by a control point in one embodiment. In operation 302, an RFID reader is instructed to transmit. In operation 304, information is received from a plurality of RFID readers, the information corresponding to a signal from an RFID device received by the plurality of readers, each of the readers independently processing the signal from the RFID device, the information including a characteristic of the signal from the RFID device such as a representation of a strength of the signal, frequency, time of start, etc. In operation 306, one or more of the readers from which the information is received is selected based on the information. In operation 308, additional information received from the selected reader(s) and corresponding to the signal from the RFID device is processed.

In one particularly preferred approach, a common control point, which may be a server 106, one of the readers, etc., instructs a reader to transmit RF signal commands to RFID devices. The control point may also instruct the transmitting reader to use a specific frequency or set of frequencies. Alternatively, the transmitting reader may autonomously select the frequency. The commands sent by the transmitting reader may be any type of standard or nonstandard communication. The command point may also command multiple readers to listen for backscatter on the specific frequency used by the transmitting reader. Readers that are capable of hearing the backscatter send the received data and characteristics such as measured signal levels back to the command point.

Command responses can be sent from the command point back to the original transmitting reader or whichever reader the command point determines is the best for the particular communication. In one approach, the measured signal levels from multiple readers may be used for estimating a location of the RFID device using well known techniques such as, but not limited to, triangulation, simple signal strength comparisons, etc. Once the location of the RFID device has been estimated, the command point may then command a new reader to be the transmitter and other readers to receive further communications. For example, a reader located closest to the RFID device can be selected for transmitting or receiving. Such reader may be identified by comparing the backscatter signal strengths at each reader and selecting the reader receiving the strongest signal strength.

Figure 4:
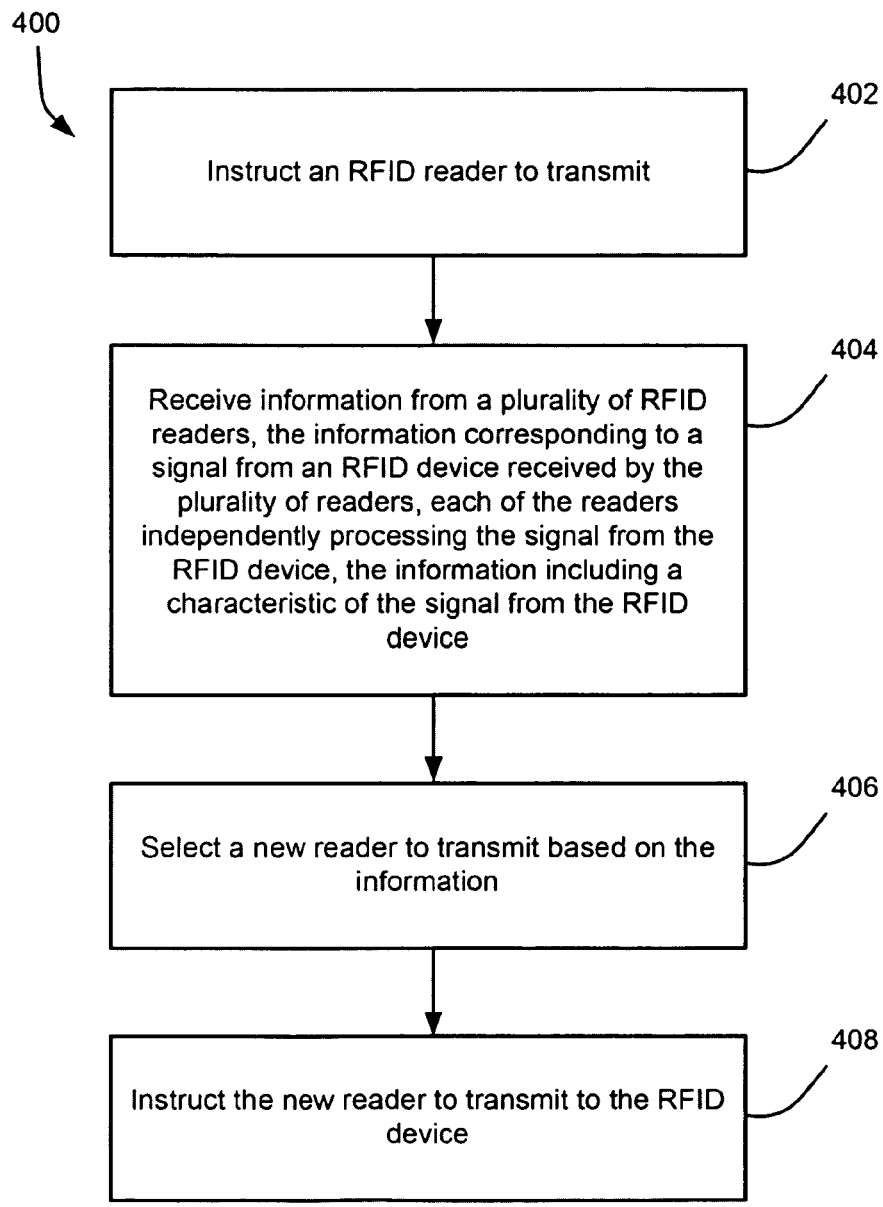
FIG. 4 is a process diagram of a general method for selecting a reader to transmit according to one embodiment.

FIG. 4 depicts a general method 400 for selecting a reader to transmit. In operation 402, one RFID reader is instructed to transmit. In operation 404, information is received from a plurality of RFID readers, the information corresponding to a signal from an RFID device received by the plurality of readers, each of the readers independently processing the signal from the RFID device, the information including a characteristic of the signal from the RFID device. A new reader is selected to transmit based on the information in operation 406. In operation 408, the new reader is instructed to transmit to the RFID device.

In further embodiments, a change in the frequency of the RFID device signal, e.g., the Doppler shift, measured at various receiving readers can be analyzed for detecting movement and/or change in position of the RFID device.

Selective incoming data stream selection may be performed by the control point. For example, in embodiments where data is received from multiple receiving readers, the various data streams may be analyzed to determine which one might be the most correct. In one approach, this may be based on the strength of the backscattered signal. In another approach, bit comparisons are performed on some or all of the data streams received from the receiving readers to determine which reader or readers is probabilistically the receiving the correct data from the RFID device.

Error correction can also be performed. In one approach, bit comparisons are performed on some or all of the data streams received from the receiving readers and the most likely data values are determined. In another approach, the information received from several selected readers and corresponding to the signal from the RFID device is processed and used to perform error correction on data from the RFID device.

Preferably, the readers' design and processing algorithms tolerate frequency errors between transmitting and receiving readers. Alternatively, or in combination with the foregoing, conventional algorithms may be used to estimate and adjust to frequency errors between the transmitting and receiving readers' oscillators.

In one particularly preferred approach, at least one of the selected readers locks onto a frequency of a carrier signal generated by the transmitting reader, wherein the carrier signal from the transmitting reader is received and analyzed directly by the at least one of the selected readers. This reduces the degradation caused by the direct reader to reader leakage and improves sensitivity in receiving backscattered signals from the RFID devices.

The delay in time caused by the network connecting the readers and control point may be considered and minimized. In one approach, the receiving readers signal to the control point over the computer network a backscatter detection early in the preamble. This may be done a significant amount of time before the tag response is completed to indicate that a tag is responding at the correct frequency and time. This signals the transmitting reader to continue sending the carrier wave signal and not to signal the start of the next time slot, e.g., by sending a QueryRep command. As soon as the backscatter response is completed, the receiving readers send their received data, with or without errors, plus any measurements of signal power level, frequency, time of start, etc. The control point may then determine the next command to send and which reader it will command to send, whether the same or another one which it determines would be better.

Figure 5:
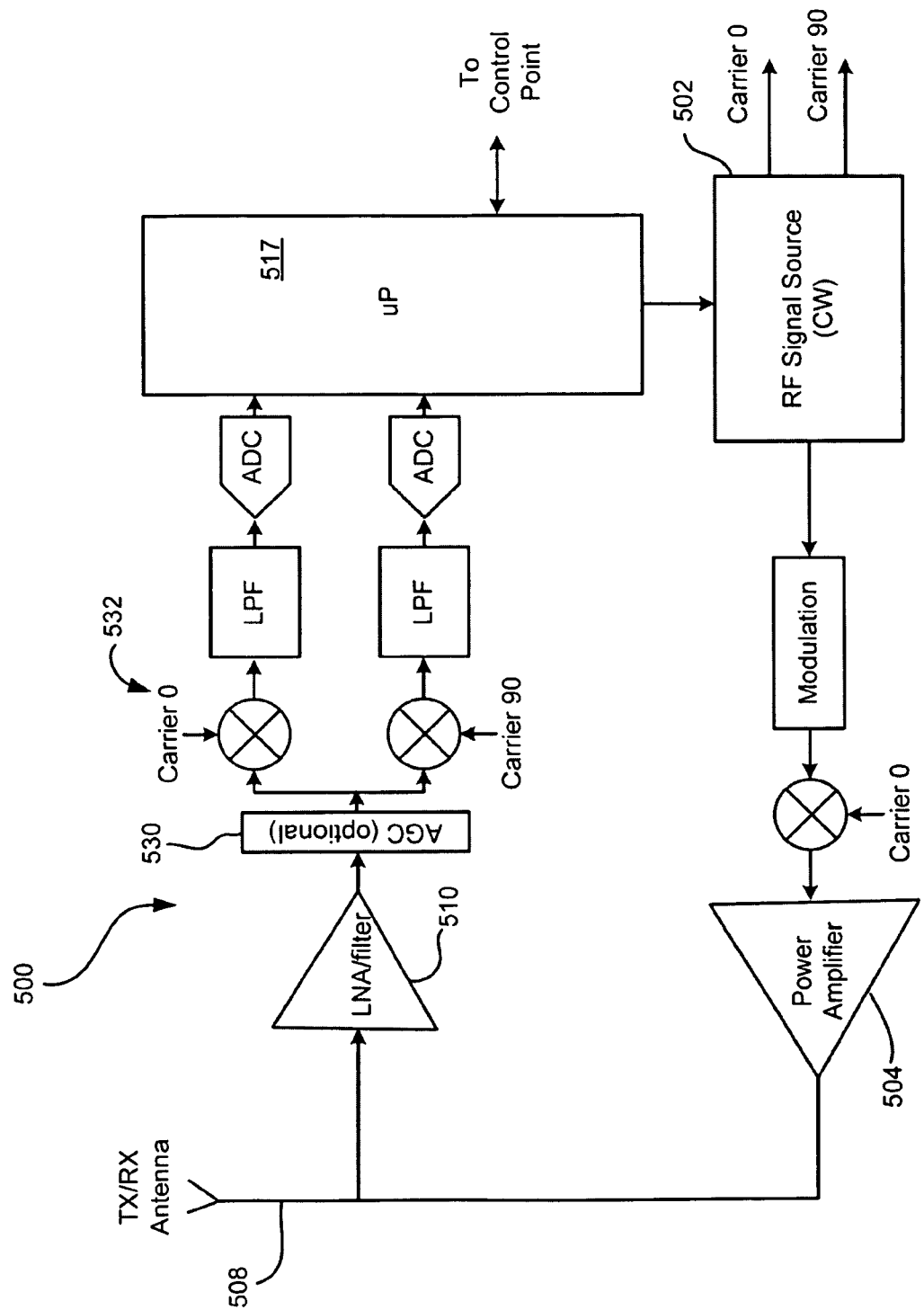
FIG. 5 is a system diagram of RFID reader circuitry according to one embodiment.

FIG. 5 is a diagram of simplified RFID reader circuitry 500 which may be used in one or more embodiments of the present invention. The system is preferably integrated into a reader, but can also be added as a supplemental hardware module in communication with the reader.

As shown in FIG. 5, a signal source 502 generates a continuous wave (CW), which is modulated and then amplified by an amplifier 504 before being sent into the environment by a transmitting/receiving antenna 508.

In a reading mode, the incoming signal received by the transmitting/receiving antenna 508 passes through an amplification stage 510, an optional automatic gain control stage 530, and downconversion stage 532 in the processing pipeline which may process and/or enhance the incoming signal. The processor 517 controls receive and transmit functions, and is in communication with the control point.

Figure 6:
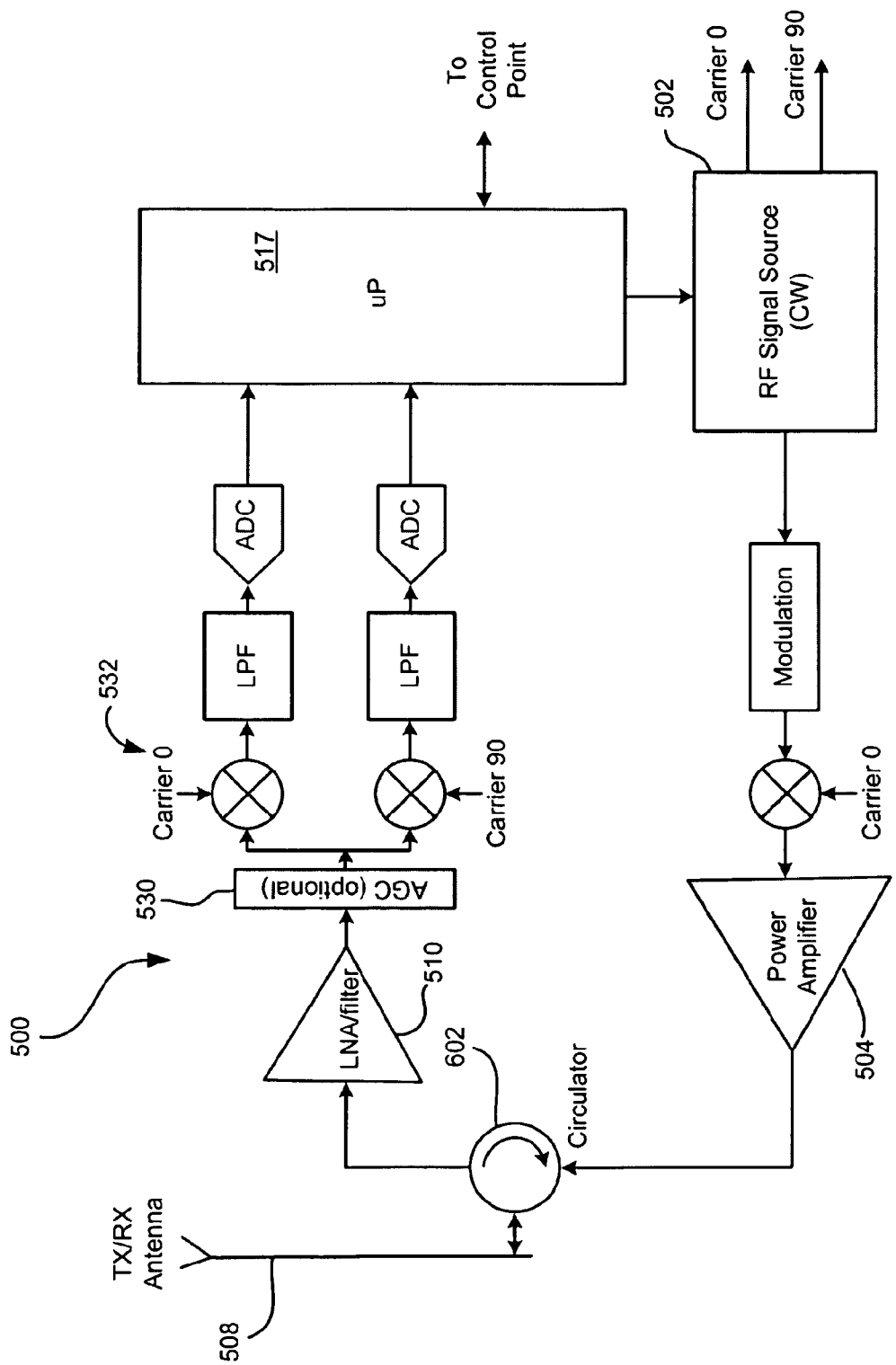
FIG. 6 is a system diagram of RFID reader circuitry according to one embodiment.

FIG. 6 depicts a variation in which the circuitry 500 of FIG. 5 includes a circulator 602. The circulator 602 creates isolation between the transmit and receive ports, thereby making this configuration preferable when the same reader transmits and receives.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a plurality of Radio Frequency Identification (RFID) readers, each reader being capable of using a single antenna for both transmit and receive functions,
    wherein, during operation, one of the readers transmits to an RFID tag and at least another of the readers receives a response to the transmission from the RFID tag, wherein the one of the readers is coupled to an antenna located remotely from an antenna coupled to the at least another of the readers;
    wherein each of the readers is coupled to only the single antenna, wherein the single antenna of each of the at least one of the readers is mounted on a housing thereof.

2. The system as recited in claim 1, wherein the at least one of the readers autonomously selects a frequency for the transmission, wherein the at least another of the readers is instructed to listen for backscatter from the RFID tag on the frequency.

3. The system as recited in claim 1, wherein each of the readers is coupled to only the single antenna, wherein the single antenna of each reader is located remotely from a housing of the reader.

4. The system as recited in claim 1, wherein each of the readers has only one antenna port.

5. The system as recited in claim 1, wherein the response from the RFID tag is a backscatter response wherein several of the readers receive and process the backscatter response, wherein the readers send data in the received backscatter response to a command point.

6. The system as recited in claim 5, wherein the readers also send a characteristic of the received backscatter response to a command point, the characteristic, including a measured signal level.

7. The system as recited in claim 1, wherein the at least another of the readers that receives the response from the RFID device processes the response, wherein the transmitting reader does not process the response.

8. The system as recited in claim 7, further comprising logic for selecting at least one of the readers as a new transmitter for further communication with the RFID device; and logic for instructing the receiving readers to listen for backscatter on a frequency used by the transmitting reader, wherein the at least one of the selected readers locks onto a frequency of a carrier signal generated by the transmitting reader, wherein the carrier signal from the transmitting reader is received and analyzed directly by the at least one of the selected readers.

9. The system as recited in claim 1, further comprising logic for instructing one of the RFID readers to transmit, wherein the transmitting reader emits a signal sufficient to communicate with a battery assisted passive RFID tag at a range of at least 20 feet; logic for receiving information from the plurality of RFID readers corresponding to a signal from an RFID device received by the plurality of readers, each of the readers independently processing the signal from the RFID device, the information including a characteristic of the signal from the RFID device; logic for selecting at least one of the readers from which the information is received based on the information; and logic for processing additional information received from the selected at least one of the readers and corresponding to the signal from the RFID device, wherein the antenna of at least one of the readers is omnidirectional.

10. The system as recited in claim 1, further comprising logic, for instructing one of the RFID readers to transmit, wherein the transmitting reader emits a signal sufficient to communicate with a battery assisted passive RFID tag at a range of at least 20 meters; logic for receiving information from the plurality of RFID readers corresponding to a signal from an RFID device received by the plurality of readers, each of the readers independently processing the signal from the RFID device, the information including a characteristic of the signal from the RFID device; logic for selecting at least one of the readers from which the information is received based on the information; and logic for processing additional information received from the selected at least one of the readers and corresponding to the signal from the RFID device, wherein the antenna of at least one of the readers is directional.

11. The system as recited in claim 1, wherein the transmitting reader emits a signal sufficient to enable receipt of the response from a battery assisted passive RFID tag by the at least another of the readers at a range of at least 20 meters between the RFID tag and the transmitting reader or the at least another of the readers.

12. A system, comprising:
a plurality of Radio Frequency Identification (RFID) readers, each reader having at least one antenna mounted on a housing thereof,
a command point in communication with each of the RFID readers, the command point being configured to instruct one of the RED readers to transmit, a signal and other of the RFID readers to receive a response from an RFID device;
wherein, during operation, the reader transmitting emits a signal sufficient to enable receipt of a response from a battery assisted passive RFID device at a range of at least 20 meters,
wherein the command point is configured to receive responses from at least some of the other readers receiving a backscatter response from the RFID device, instruct the transmitting reader to transmit instructions to the RFID device, and select one of the RFID readers closest to the RFID device to receive a backscatter response to the instructions based on the responses, the selected RFID reader being different than the transmitting reader.

13. The system as recited in claim 12, wherein the antenna of at least one of the readers is mounted on a housing, thereof.

14. The system as recited in claim 12, wherein each of the readers has only one antenna.

15. The system as recited in claim 12, wherein each of the readers has only one antenna port.

16. The system as recited in claim 12, wherein several of the readers are selected to receive and process the backscatter response, wherein the selected readers each send a characteristic of the received backscatter response to the command point, the characteristic including a measured signal level.

17. The system as recited in claim 12, wherein several of the readers receive and process the backscatter response, wherein the readers send data in the received backscatter response to a command point.

18. A method, comprising:
instructing one Radio Frequency Identification (RFID) reader to transmit a first signal;
receiving information from a plurality of RFID readers corresponding, to a signal from an RFID device received by the plurality of readers, each of the readers independently processing the signal from the RFID device, the information including a characteristic of the signal from the RFID device;
selecting at least one of the readers from which the information is received based on the information;
processing additional inthrmation received from the selected at least one of the readers and corresponding, to the signal from the RFID device;
selecting at least one of the readers as a new transmitter for further communication with the RFID device based on the information, the new transmitter being different than the RFID reader instructed to transmit the first signal; and
selecting at least one of the RFID readers as a receiver for receiving a backscatter response from the RFID device to instruction sent by the new transmitter,
wherein the receiver and new transmitter are different RFID readers.

19. The method as recited in claim 18, wherein the characteristic of the signal includes a representation of a strength of the signal.

20. The method as recited in claim 18, further comprising detecting movement of the RFID device by analyzing a difference in frequency of the RFID device signal received by different readers.

21. The method as recited in claim 18, further comprising instructing the receiving readers to listen for backseatter on a frequency used by the transmitting reader.

22. The method as recited in claim 18. wherein the at least one of the selected readers locks onto a frequency of a carrier signal generated by the transmitting reader, wherein the carrier signal from the transmitting reader is received and analyzed directly by the at least one of the selected readers.

23. A method, comprising:
   instructing one Radio Frequency Identification (RFID) reader to transmit a first signal;
   receiving information from a plurality of RFID readers corresponding to a signal from an RFID device received by the plurality of readers, each of the readers independently processing the signal from the RFID device, the information including a characteristic of the signal from the RFID device;
   selecting multiple readers from which the information is received based on the information;
   processing additional information received from the selected readers and corresponding to the signal from the RFID device; and
   performing error correction on data sent by the RFID device using the processed information from the selected readers, the error correction including comparing the processed data from the selected readers and determining most likely data values based on the comparison.

24. The method as recited in claim 23, wherein all readers receiving the signal are selected.

25. A method, comprising:
   instructing one Radio Frequency Identification (RFID) reader to transmit;
   receiving information from a plurality of RFID readers, the information corresponding to a signal from an RFID device received by the plurality of readers, each of the readers independently processing the signal from the RFID device, the information including a characteristic of the signal from the RFID device;
   selecting a new reader to transmit based on the information; and
   instructing the new reader to transmit to the RFID device; and
   receiving information from the plurality of RFID readers, the information corresponding to a second signal received by the plurality of readers from the RFID device in response to the new reader transmitting, each of the readers independently processing the second signal from the RFID device.

26. The method as recited in claim 25, further comprising detecting movement of the RFID device by analyzing a difference in frequency Of the RFID device signal received by different readers.

27. A system, comprising:
   a plurality of Radio Frequency Identification (RFID) readers, each reader being capable of using a single antenna for both transmit and receive functions,
   wherein, during operation, one of the readers transmits to an RFID tag and at least another of the readers receives a response to the transmission front the RFID tag,
   wherein the one of the readers is coupled to an antenna located remotely from an antenna coupled to the at least another of the readers;
   logic for instructing one of the RFID readers to transmit, wherein the transmitting reader emits a signal sufficient to communicate with a battery assisted passive RFID tag at a range of at least 20 meters;
   logic for receiving information from the plurality of RFID readers corresponding to a signal from an RFID device received by the plurality of readers, each of the readers independently processing the signal from the RFID device, the information including a characteristic of the signal from the RFID device;
   logic, for selecting at least one of the readers from which the information is received based on the information;
   logic for processing additional information received from the selected at least one of the readers and corresponding to the signal from the RFID device, wherein the antenna of at least one of the readers is directional;
   logic, for selecting at least one of the readers as a new transmitter for further communication with the RFID device, and
   logic for instructing the receiving readers to listen for backscatter on a frequency used by the transmitting reader,
   wherein the at least one of the selected readers locks onto a frequency of a carrier signal generated by the transmitting reader, wherein the carrier signal from the transmitting reader is received and analyzed directly by the at least one of the selected readers.

28. The system as recited in claim 27, further comprising logic for selecting at least one of the readers as a new transmitter for further communication with the RFID device; and logic for instructing the receiving readers to listen for backscatter on a frequency used by the transmitting reader, wherein the at least one of the selected readers locks onto a frequency of a carrier signal generated by the transmitting reader, wherein the carrier signal from the transmitting reader is received and analyzed directly by the at least one of the selected readers.

29. The system as recited in claim 28, further comprising logic for selecting at least one of the readers as a new transmitter for further communication with the RFID device; and logic for instructing the receiving readers to listen for backscatter on a frequency used by the transmitting reader, wherein the at least one of the selected readers locks onto a frequency of a carrier signal generated by the transmitting reader, wherein the carrier signal from the transmitting reader is received and analyzed directly by the at least one of the selected readers.

30. A system, comprising:
   a plurality of Radio Frequency Identification (RFID) readers, each reader having at least one antenna mounted on a housing thereof,
   a command point in communication with each of the RFID readers, the command point being configured to instruct one of the RFID readers to transmit a signal and other of the RFID readers to receive a response from an RFID device;
   wherein, during operation, the reader transmitting emits a signal sufficient to enable receipt of a response from a battery assisted passive RFID device at a range of at least 20 meters,
   wherein the command point is configured to receive responses from at least some of the other readers receiving a backscatter response from the RFID device, and select one of the RFID readers closest to the RFID device for further transmitting or receiving based on the responses;
   logic for instructing, one of the RFID readers to transmit;
   logic for receiving information from the plurality of RFID readers corresponding to a signal from an RFID device received by the plurality of readers, each of the readers independently processing the signal from the RFID device, the information including a characteristic of the signal from the RFID device;
   logic for selecting at least one of the readers from which the information is received based on the information; and
   logic for processing additional information received from the selected at least one of the readers and corresponding to the signal from the RFID device,
   wherein the antenna of at least one of the readers is omnidirectional.

31. A system, comprising:

a plurality of Radio Frequency identification (RFID) readers, each reader having at least one antenna mounted on a housing, thereof, a command point in communication with each of the RFID readers, the command point being configured to instruct one of the RFID readers to transmit a signal and other of the RFID readers to receive a response from an RFID device;

wherein, during operation, the reader transmitting emits a signal sufficient to enable receipt of a response from a battery assisted passive RFID device at a range of at least 20 meters, wherein the command point is configured to receive responses from at least some of the other readers receiving a backscatter response from the RFID device, and select one of the RFID readers closest to the RFID device for further transmitting or receiving based on the responses;

logic for instructing one of the RFID readers to transmit;

logic for receiving information from the plurality of RFID readers corresponding to a signal from an RFID device received by the plurality of readers, each of the readers independently processing the signal from the RFID device, the information including a characteristic of the signal from the RFID device;

logic for selecting at least one of the readers from which the information is received based on the information; and logic for processing additional information received from the selected at least one of the readers and corresponding to the signal from the RFID device, wherein the antenna of at least one of the readers is directional, wherein the antenna of at least one of the readers is omnidirectional.

* * * * *